United States Patent Office 3,377,366
Patented Apr. 9, 1968

3,377,366
17α - ALKYNYL/ALKENYL - 11,13β - DIALKYL-GON - 5(10) - EN - 3 - ONES AND ESTERS THEREOF
John S. Baran, Morton Grove, Ill., assignor to G. D. Searle & Co., Chicago, Ill., a corporation of Delaware
No Drawing. Continuation-in-part of application Ser. No. 512,539, Dec. 8, 1965. This application May 31, 1967, Ser. No. 642,293
Claims priority, application Germany, Dec. 2, 1966, S 107,240
4 Claims. (Cl. 260—397.45)

ABSTRACT OF THE DISCLOSURE

17α - alkynyl/alkenyl - 11,13β - dialkylgon - 5(10)-en-3-ones and esters thereof useful as potent deciduogenic and estrogenic agents with accompanying lack of progestational side effects and preparable by sequential reduction of the Δ$^{9(11)}$ double bond and 17-keto group of 3 - (lower alkoxy) - 11,13β - dialkylgona - 1,3,5(10),9(11)-tetraen-17-ones, Birch reduction of the aromatic A-ring to yield the corresponding gona-2,5(10)-dienes, oxidation of the 17-hydroxy group, alkynylation of the resulting 17-keto group and mild acid hydrolysis to produce the instant 17α-alkynyl derivatives. Partial catalytic hydrogenation of the intermediate 17-alkynyl enol ethers followed by mild acid hydrolysis affords the instant 17-alkenyl substances. The esters are produced by acylation of the 17-hydroxy compounds.

This application is a continuation-in-part of my co-pending application Ser. No. 512,539, filed Dec. 8, 1965, now U.S. Patent 3,325,520.

The present invention is concerned with novel 11-alkyl-Δ$^{5(10)}$-3-keto steroids characterized by an unsaturated hydrocarbon substituent at the 17-position and, more particularly, with 17α - alkynyl/alkenyl - 11,13β-dialkylgon - 5(10) - ene-3-ones and esters thereof which are represented by the following structural formula

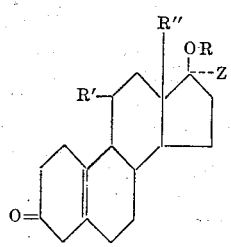

wherein R' and R" are lower alkyl radicals, Z is a lower alkynyl or lower alkenyl radical and R is hydrogen or a lower alkanoyl radical.

The lower alkyl radicals represented by R' and R" are exemplified by methyl, ethyl, propyl, butyl, pentyl, hexyl, heptyl and the branched-chain isomers thereof.

Representative of lower alkynyl radicals denoted by Z are ethynyl, propynyl, butynyl, pentynyl, hexynyl, and heptynyl, while the lower alkenyl radicals denoted thereby are typified by vinyl, propenyl, butenyl, pentenyl, hexenyl, heptenyl, and the corresponding branched-chain isomers.

The R term symbolizes lower alkanoyl radicals such as formyl, acetyl, propionyl, butyryl, valeryl, caproyl, heptanoyl and the corresponding branched-chain groups.

Starting materials suitable for utilization in the manufacture of compounds of the present invention are those represented by the following structural formula

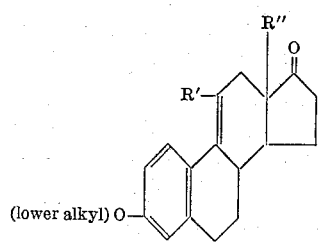

wherein R' and R" are as hereinbefore defined. Their manufacture is described in U.S. Patent 3,299,108, issued Jan. 17, 1967. Reaction of those starting materials with a metallic reducing agent results in selective reduction of the 17-keto function to produce the corresponding 17-hydroxy compound. As a specific example, 3-methoxy-11-methylestra - 1,3,5(10),9(11) - tetraen-17-one in tetrahydrofuran is contacted with lithium tri-(tertiary-butoxy) aluminum hydride, thus affording 3 - methoxy-11-methyl-estra - 1,3,5(10),9(11) - tetraen - 17β-ol. Reduction of the 9(11) double bond is conveniently effected by reaction of the latter substance with hydrogen in the presence of a suitable hydrogenation catalyst. The aforementioned 3 - methoxy - 11 - methylestra - 1,3,5(10),9(11)-tetraen-17β-ol is thus shaken with hydrogen in the presence of 10% palladium-on-carbon catalyst to yield 3-methoxy-11β - methylestra - 1,3,5(10)-trien-17β-ol. An alternate route to the latter substances involves initial hydrogenation of the 9(11) double bond and subsequent reduction of the 17-keto group. The aforementioned 3-methoxy-11-methylestra - 1,3,5 - (10),9(11) - tetraen - 17 - one is thus hydrogenated to afford 3-methoxy-11β-methyl-estra-1,3,5(10)-trien-17-one, which is reduced to yield 3 - methoxy - 11β - methylestra - 1,3,5(10)-trien-17β-ol. Reduction of those estratrienes with an alkali metal-liquid ammonia combination results in the corresponding estra - 2,5(10) - dienes. Typically, 3 - methoxy - 11β-methyl - estra - 1,3,5(10) - trien - 17β - ol in tetrahydrofuran is contacted with sodium and liquid ammonia to afford 3 - methoxy - 11β - methylestra - 2,5(10) - dien-17β-ol. Oxidation of those 17-hydroxy substances results in the required 17-keto compound. Typically, the aforementioned 3 - methoxy - 11β - methylestra-2,5(10)-dien-17β-ol is heated with aluminum isopropoxide and cyclohexanone in toluene to afford 3 - methoxy - 11β-methylestra - 2,5(10) - dien - 17 - one. The reaction of that substance with lithium acetylide, suitably in the form of its ethylene diamine complex, results in 17α-ethynyl-3-methoxy - 11β - methylestra - 2,5(10) - dien - 17β - ol. Mild acid hydrolysis of the latter enol ethers results in the instant 3-keto-Δ$^{5(10)}$ compounds. Reaction of the aforementioned 17α - ethynyl - 3 - methoxy - 11β - methyl-estra - 2,5(10) - dien - 17β - ol with acetic acid in aqueous methanol thus yields 17α-ethynyl-17β-hydroxy-11β-methylestr-5(10)-en-3-one.

Acylation of the 17-hydroxy compounds of the present invention with a lower alkanoic acid anhydride or halide, preferably in the presence of a suitable acid acceptor, results in the corresponding 17-(lower alkanoates) 17α-ethynyl - 17β-hydroxy - 11β-methylestr-5(10)-en-3-one is thus heated with acetic anhydride and pyridine to afford 17β-acetoxy-17α-ethynyl-11β-methylestr-5(10)-en-3-one.

The instant 17α-alkenyl compounds are produced by selective catalytic hydrogenation of the corresponding 17α-alkynyl enol ethers followed by mild acid hydrolysis, as described hereinbefore. 17α-ethynyl-3-methoxy-11β-methylestra-2,5(10)-dien-17β-ol, for example, is shaken in pyridine with 5% palladium-on-carbon catalyst at atmospheric pressure and room temperature to afford 3-methoxy - 11β - methyl - 17α - vinylestra - 2,5(10) - dien-17β-ol, which is hydrolyzed with acetic acid in aqueous methanol to afford 17β-hydroxy-11β-methyl-17α-vinyl-estr-5(10)-en-3-one.

The instant compounds wherein the 13β-alkyl group contains more than one carbon atom are obtained as dl-mixtures. Resolution of these dl compounds to afford the individual d and l enantiomorphs is conveniently effected by esterification of the hydroxy group with a dibasic acid anhydride such as succinic or phthalic anhydride to afford the corresponding acid ester, which is resolved by means of an optically active amine such as brucine, morphine, quinine, quinidine, strychnine, etc.

The compounds of this invention display valuable pharmacological properties. They are particularly useful as potent deciduogenic and estrogenic agents and possess the advantage of lacking progestational side-effects.

The instant compounds can be administered in any of a number of conventional pharmaceutical forms and also by conventional routes. For oral administration suitable solid forms are pills, powders, capsules, tablets or the like and suitable liquid forms are syrups, emulsions, elixirs, suspensions and the like. For parenteral administration these compounds can be dispersed in an aqueous suspension or dissolved in a pharmacologically acceptable oil or oil-water emulsion. Suitable excipients can also be added.

The pharmacological activity of the novel compounds of this invention is specifically illustrated by the estrogenic response produced in female rats injected subcutaneously with corn oil solutions of 17α-ethynyl-17β-hydroxy-11β-methylestr-5(10)-en-3-one administered over a period of 24 hours at total doses varying between 0.001 and 1.0 mg. As compared to the standard, i.e. subcutaneously administered estrone, this compound possesses a potency of 330%.

The invention will appear more fully from the examples which follow. These examples are given by way of illustration only and are not to be construed as limiting the invention either in spirit or in scope as many modifications both in materials and methods will be apparent from this disclosure to those skilled in the art. In the following examples temperatures are given in degrees centigrade (° C.) and quantities of materials in parts by weight unless otherwise noted.

Example 1

A solution of 3 parts of 3-methoxy-11-methylestra-1,3,5(10),9(11)-tetraen-17-one and 9 parts of lithium tri-(tertiary-butoxy) aluminum hydride in 113 parts of tetrahydrofuran is stirred at room temperature for about 2 hours, then is poured into a mixture consisting of 70 parts by volume of 50% aqueous acetic acid and 30 parts of ice. Extraction of that aqueous mixture with chloroform affords an organic solution, which is washed successively with aqueous sodium sulfate and aqueous sodium bicarbonate, then is dried over anhydrous magnesium sulfate and distilled to dryness under reduced pressure to afford, as a viscous oil, 3-methoxy-11-methylestra-1,3,5(10),9(11)-tetraen-17β-ol, characterized by infrared absorption maxima, in chloroform, at about 2.78, 2.90, 6.22 and 6.38 microns.

To a solution of 2.5 parts of 3-methoxy-11-methylestra-1,3,5(10),9(11)-tetraen-17β-ol in 240 parts of methanol is added 0.3 part of 10% palladium-on-carbon catalyst, and the resulting reaction mixture is shaken with hydrogen at atmospheric pressure and room temperature until one molecular equivalent of hydrogen has been absorbed. The catalyst is removed by filtration, and the filtrate is concentrated to dryness under reduced pressure. After standing at room temperature for approximately 48 hours, the initial oily residue becomes crystalline. That material is purified by recrystallization from ether-hexane to afford 3-methoxy-11β-methylestra-1,3,5(10)-trien-17β-ol, melting at about 103–105°. In potassium bromide this compound exhibits infrared absorption maxima at about 3.00, 6.21, 6.35 and 6.65 microns. It displays also ultraviolet absorption at about 278 and 287 millimicrons with molecular extinction coefficients of about 1,800 and 1,650 respectively.

To a solution containing 70 parts of liquid ammonia, 45 parts of tetrahydrofuran and 5.6 parts of tertiary-butyl alcohol is added a solution of 1 part of 3-methoxy-11β-methylestra-1,3,5(10)-trien-17β-ol in 18 parts of tetrahydrofuran, and the resulting mixture is stirred while 0.5 part of sodium is added over a period of about 40 minutes. At the end of that time, the blue color is destroyed by the addition of approximately 8 parts of methanol, and the solution is evaporated to dryness under reduced pressure. Trituration of the residual mixture with ice water affords a crystalline product, which is collected by filtration, washed with water and dried under reduced pressure to yield 3-methoxy-11β-methylestra-2,5(10)-dien-17β-ol, characterized by infrared absorption maxima, in chloroform, at about 2.99, 5.88 and 5.99 microns.

A solution containing 8 parts of 3-methoxy-11β-methylestra-2,5(10)-dien-17β-ol, 870 parts of toluene, 20 parts of aluminum isopropoxide and 47.5 parts of cyclohexanone is heated at the reflux temperature for about 1 hour, following which time 500 parts by volume of saturated aqueous sodium potassium tartrate is added. The volatile organic material is removed by steam distillation, and the resulting aqueous residue is cooled and extracted with ether. Drying of the ether extract over anhydrous magnesium sulfate followed by concentration of the solution to dryness affords a residue, which is triturated with hexane to afford crystals of 3-methoxy-11β-methylestra-2,5(10)-dien-17-one, melting at about 137–139°. It displays infrared absorption maxima, in potassium bromide, at about 5.72, 5.90 and 6.00 microns.

A mixture of 1 part of 3-methoxy-11β-methylestra-2,5(10)-dien-17-one, 25 parts of the 30% lithium acetylide-70% ethylene diamine complex and 450 parts of tetrahydrofuran is stirred in a nitrogen atmosphere at about 0° for approximately 2½ hours, then is diluted with approximately 500 parts of water. The resulting mixture is partially concentrated under reduced pressure, then is extracted with ether. The ether extract is washed with dilute aqueous sodium chloride, then is dried over anhydrous magnesium sulfate and concentrated to dryness under reduced pressure to afford crystalline 17α-ethynyl-3-methoxy-11β-methylestra-2,5(10)-diene-17β-ol, which exhibits infrared absorption maxima at about 2.77, 3.01, 5.90 and 6.00 microns.

A mixture containing 5 parts of 17α-ethynyl-3-methoxy-11β-methylestra-2,5(10)-dien-17β-ol, 1,000 parts by volume of 80% aqueous methanol and 100 parts of acetic acid is stirred in a nitrogen atmosphere with warming for about 30 minutes. The reaction mixture is then diluted with water and excess saturated aqueous sodium bicarbonate. Extraction of that aqueous mixture with chloroform affords an organic solution, which is dried over anhydrous magnesium sulfate and concentrated to dryness. Trituration of the resulting residue with ether affords crystals of 17α-ethynyl-17β-hydroxy-11β-methyl-ester-5(10)-en-3-one, melting at about 176–177° and ex-

Example 2 hibiting infrared maxima, in chloroform, at about 2.76, 3.01 and 5.84 microns. It is represented by the following structural formula

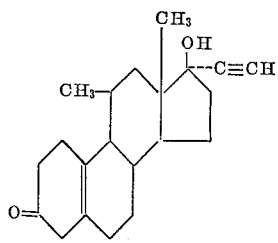

When an equivalent quantity of the lithium propynylide-ethylene diamine complex is substituted in the procedure of Example 1, there are produced 3-methoxy-11β-methyl-17α-propynylestra-2,5(10)-dien-17β-ol and 17β-hydroxy-11β-methyl-17α-propynylestr-5(10)-en-3-one.

Example 3

A mixture containing 2 parts of 17α-ethynyl-17β-hydroxy-11β-methylestr-5(10)-en-3-one, 20 parts of acetic anhydride and 40 parts of pyridine is heated at 90–100° for about 2 hours, then is cooled and poured carefully into water. The resulting aqueous mixture is extracted with benzene, and the organic layer is separated, washed with water, dried over anhydrous sodium sulfate and stripped of solvent under reduced pressure to afford 17β-acetoxy-17α-ethynyl-11β-methylestr-5(10)-en-3-one.

Example 4

When equivalent quantities of 17β-hydroxy-11β-methyl-17α-propynylestr-5(10)-en-3-one and propionic anhydride are substituted in the procedure of Example 3, there is produced 11β-methyl-17β-propionoxy-17α-propynylestr-5(10)-en-3-one.

Example 5

A solution of 4 parts of 17α-ethynyl-3-methoxy-11β-methylestra-2,5(10)-dien-17β-ol in 200 parts of pyridine is shaken with 0.4 part of 5% palladium-on-carbon catalyst as atmospheric pressure and room temperature until 1 molecular equivalent of hydrogen is absorbed. The catalyst is removed by filtration, and the filtrate is evaporated to dryness at reduced pressure to afford 3-methoxy-11β-methyl-17α-vinylestra-2,5(10)-dien-17β-ol.

Hydrolysis of the latter enol ether with acetic acid according to the procedure described in Example 1 results in 17β-hydroxy-11β-methyl-17α-vinylestr-5(10)-en-3-one.

What is claimed is:
1. A compound of the formula

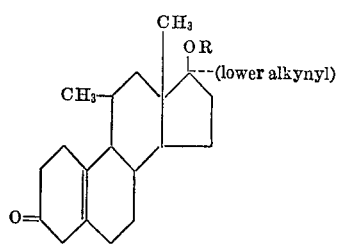

wherein R is selected from the group consisting of hydrogen and a lower alkanoyl radical.

2. As in claim 1, a compound of the formula

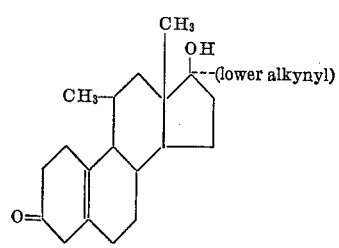

3. As in claim 1, a compound of the formula

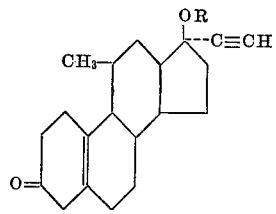

wherein R is selected from the group consisting of hydrogen and a lower alkanoyl radical.

4. As is claim 1, the compound which is 17α-ethynyl-17β-hydroxy-11β-methylestr-5(10)-en-3-one.

References Cited

UNITED STATES PATENTS 3,048,606  8/1962  Wettstein et al. ___ 260—397.45
2,725,389  11/1955  Colton.

LEWIS GOTTS, *Primary Examiner.*

T. MESHBESHER, *Assistant Examiner.*